United States Patent [19]

Sturtz

[11] 4,249,441
[45] Feb. 10, 1981

[54] APPARATUS FOR CHOPPING STRAND
[75] Inventor: John V. Sturtz, Toledo, Ohio
[73] Assignee: Johns-Manville Corporation, Denver, Colo.
[21] Appl. No.: 19,203
[22] Filed: Mar. 9, 1979
[51] Int. Cl.³ .............................................. D01G 1/04
[52] U.S. Cl. ....................................... 83/347; 83/348; 83/698; 83/913
[58] Field of Search ................. 83/347, 348, 674, 698, 83/913

[56] References Cited
U.S. PATENT DOCUMENTS

| 3,508,461 | 4/1970 | Stream .............................. 83/347 X |
| 3,644,109 | 2/1972 | Klink et al. ....................... 83/347 X |
| 3,815,461 | 6/1974 | Genson ................................. 83/347 |
| 3,869,268 | 3/1975 | Briar et al. ........................ 83/347 X |
| 4,083,279 | 4/1978 | Wester et al. ......................... 83/347 |

Primary Examiner—Frank T. Yost
Attorney, Agent, or Firm—Robert M. Krone; Joseph J. Kelly; William C. Anderson

[57] ABSTRACT

This invention pertains to an improved blade retaining means for a blade roll used in a chopper assembly which severs continuous lengths of a material into discrete increments. Prior art devices provided blade retaining means which facilitated stress-inducing vibrations and generated stress concentrations in the ends of the blades. Attempts to cushion the blades using an elastomer blade restraining insert were incapable of eliminating contamination of the work product due to a severing of the insert when the blades were installed and used. Other blade retaining means were incapable of reuse and prevented use of the chopper blades directly from the manufacturer, i.e., all of the blades had to be cut to an exact and equal length. Accordingly, the present invention provides an improved blade retaining means comprising an annular blade retainer 52 positioned at each end of a blade roll cylinder member 50 wherein a side surface of each of the blade retainers 52 has at least one annular groove 62. Reusable blade retaining urethane rings 64 each have an annular bead 66 which is positioned within each annular groove 62 so that the blade retaining rings 64 engage chopper blades 34 at each end thereof in order to elastically restrain chopper blades 34, which need not be cut to an exact length, against movement in a direction circumferentially and radially of the blade roll cylinder member 50.

12 Claims, 2 Drawing Figures

APPARATUS FOR CHOPPING STRAND

TECHNICAL FIELD

This invention relates broadly to the drawing of continuous filaments from a source of molten glass, gathering the filaments into strands and cutting the strands into short lengths principally for use as a reinforcement medium. More particularly the invention pertains to an improved chopper blade retaining means for a blade roll which is used to cut the strands.

BACKGROUND OF PRIOR ART

It is known to sever continuous lengths of materials into discrete increments by passing the material between a backup roll and a series of radially projecting cutting or chopper blades mounted and spaced evenly about the periphery of a blade roll.

A typical prior art blade roll may comprise a stainless steel blade roll cylinder member which has been milled in order to provide a plurality of cutting or chopper blade supporting slots. In U.S. Pat. No. 3,869,268 chopper blade supporting slots are milled with a thickness which is larger than the thickness of generally rectangular chopper blades which are mounted in the cylinder member. This is done in order to avoid the excessive cost of milling each slot to the exact thickness of an individual chopper blade. However, by milling the slots to be somewhat larger than the chopper blades, e.g., 0.002–0.004 inch, the blades tend to vibrate within the slots during operation of the blade roll. Movement of a cutting blade radially outward and circumferentially of the supporting blade roll is disclosed as being reduced in U.S. Pat. No. 3,869,268 by the use of semi-circular protrusions which are formed on end fasteners holding the cutting blades. However, vibration facilitated by the oversized slots tends to cause the chopper blades to wear more rapidly thus shortening the effective life of the chopper blades. The semi-circular protrusions also tend to set up deleterious stress concentrations within the mating parts. In order to more firmly hold chopper blades in position in a blade roll, U.S. Pat. Nos. 3,508,461 and 3,644,109 incorporate a resilient gasket mounted in contact with the side edges of chopper blades having generally trapezoidal cross-sections. In use, after the chopper blades are positioned in the blade roll an end cap is fastened securely to the blade roll which abuttingly engages the resilient gasket. The end caps are tightly fastened against a respective gasket in order to rigidly fix the blades so that outward and circumferential movement of the blades from the blade roll member may be prevented. In tightly fastening the end caps against the gasket the blades are often forced to cut through the resilient gasket such that the ability of the gasket to retain the chopper blades in position is not only destroyed but other hazards may be created. These hazards include the random and unpredictable motion of gasket fragments which may fly out and contaminate the material being chopped, or in an extreme case strike an operator of the chopper assembly. In all likelihood, the blades must be cut to an exact length in order to reduce this problem.

U.S. Pat. No. 4,083,279 provides a chopper blade retaining means for a blade roll which comprises an annular blade retainer positioned at each end of a blade roll cylinder member. A side surface of each of the blade retainers has at least one annular groove which may be situated radially inwardly of the outer diameter of the blade roll cylinder member when the centerline of each blade retainer is in alignment with the centerline of the blade roll cylinder member. A blade retaining ring made of copper is positioned partially within the at least one annular groove of each blade retainer such that the blade retaining rings engage each side edge of the chopper blades in order to restrain each chopper blade against movement in a circumferential and radial direction. While very useful, the blade retaining means of U.S. Pat. No. 4,083,279 suffers from several disadvantages. For example the chopper blades cannot be used directly as received from the manufacturer because the chopper blades vary in length by as much as 0.20–0.28″ and the structural relationships of the various components cannot account for such a variance in blade lengths. It is therefore usually necessary to grind the chopper blades to an exact length. Since machining costs are high it is usually uneconomical and therefore undesirable to grind the chopper blades to an exact length which is suitable for the particular apparatus. Further, the chopper blade retaining rings cannot be reused because as each annular blade retainer is tightened against the blade roll cylinder member the copper retaining rings are crushed by the blades and will "cold flow" around and grip the ends of the chopper blades. After such force has been applied and the chopper blades have been used, the blade retaining rings will have a series of permanent indentations. The copper blade retaining rings thus have to be changed every time the blade roll is serviced. Finally, end stresses on the chopper blades induced by the constraint of the blade retaining rings on the ends of the blades may cause blade breakage thus shortening their effective chopping life.

Accordingly it is an object of the present invention to overcome the disadvantages of prior art blade rolls by providing a blade roll having an improved blade retaining means which increases the effective chopping life of the chopper blades.

It is a further object of the present invention to provide an improved blade retaining means for use in a chopper assembly which substantially eliminates undesirable vibration of the chopper blades mounted within a blade roll cylinder member.

Another object of the present invention is to provide a blade retainer which reduces the contamination of the material being chopped.

A still further object of the present invention is the provision of a constraint on the movement of chopper blades in a chopper assembly in a circumferential and radial direction which allows installation of blades directly as received from the manufacturer.

Still another object of the present invention is the provision of a chopper blade constraint which is safe, has a long service life and can be used repetitively.

An additional object of the present invention is to provide a cushioned support for cutting blades in a blade roll cylinder member thereby reducing blade breakage.

Accordingly, the present invention provides an improved blade retaining means comprising an annular blade retainer positioned at each end of a blade roll cylinder member wherein a side surface of each of the blade retainers has at least one annular groove situated radially inwardly of the outer diameter of the blade roll cylinder member when the centerline of the blade retainer is in alignment with the centerline of the blade roll cylinder member. A blade retaining urethane ring is positioned at least partially within the annular groove of each blade retainer so that the blade retaining ring engages the chopper blades at each end thereof thereby restraining the chopper blades against movement in a circumferential and radial direction.

DETAILED DESCRIPTION OF INVENTION

Figure 1:
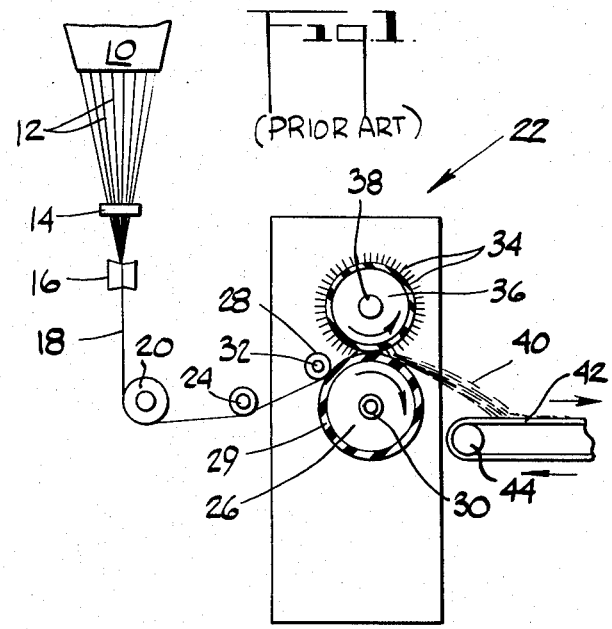
FIG. 1 is a diagrammatic front elevation of a conventional chopper assembly and its associated equipment for drawing continuous filaments from a source and advancing those filaments between a blade roll and backup roll to a collection conveyor.

As shown in FIG. 1, a fiber forming bushing 10 provides molten glass from which filaments 12 are drawn at high speeds and passed over a size applicator 14 to a gathering wheel 16 to form strands 18. These strands 18 are guided by guide wheels 20 in parallel paths to a chopper 22 having guide wheels 24. From guide wheels 24 the strands are carried over a backup roll 26 which can be faced with a layer of urethane 29 in order to enhance the frictional forces developed between the strands 18 and roll 26. Further enhancement of the filament pulling force developed at roll 26 is achieved by a pressure roll 28 which forces the strands 18 against roll 26.

Roll 26 is mounted on a shaft 30 which is supported in a pillow block (not shown) so that it extends as a cantilever from a chopper frame (not shown). A pressure roll shaft 32 has bearings mounted on a lever (not shown) to mount roll 28 in a cantilevered or overhung fashion. Strands 18 are chopped as they are carried by roll 26 into a region at the upper face of the roll engaged by blades 34 which are mounted to protrude radially from a blade roll 36. Shaft 38 supports blade roll 36 as a cantilever extending from the chopper frame and in turn is mounted in a pillow block (not shown) mounted for vertical adjustment to move shaft 38 toward and away from the shaft 30 to move blade roll 36 with respect to backup roll 26.

After strand 18 is chopped between the generally vertically aligned blade roll 36 and backup roll 26 it issues tangentially along a generally horizontal trajectory as chopped strand 40. This horizontal trajectory enables the strand which has advanced to the chopping station at the filament pouring speed to decelerate during its flight so that its impact on a collecting surface 42 is reduced from the usual impact of downwardly directing chopped strand. Further reduction of impact is achieved by advancing the collecting surface 42 with a component of motion parallel to the trajectory at its point of impact as by employing an endless conveyor belt trained over a head pulley 44.

As noted above, it is known as described in U.S. Pat. No. 4,083,279, incorporated herein by reference, to have a blade roll comprising a blade roll cylinder member having a rotatable core. A reslient, durable elastomer tire fixed about the outer circumferential surface of the core wherein the elastomer tire has a cylindrical outer surface configuration. A plurality of milled slots which have a thickness slightly less than the greatest thickness of the base portion of the chopper blades extend generally lengthwise of the blade roll cylinder member. Chopper blades are inserted into the slots so that the sides of the slots tend to grip the base portion of the chopper blades. Furthermore, a blade retaining means comprising an annular blade retainer is positioned at each end of the blade roll cylinder member wherein a side surface of each of the blade retainers has at least one annular groove therearound which is situated radially inward of the outer diameter of the blade roll cylinder when the centerline of each blade retainer is in alignment with the centerline of the blade roll cylinder member. A copper blade retaining ring is positioned partially within the at least one annular groove of each blade retainer so that the blade retaining rings engage the chopper blades at each end thereof to restrain the chopper blades against movement in both a circumferential and radially outward direction.

Figure 2:
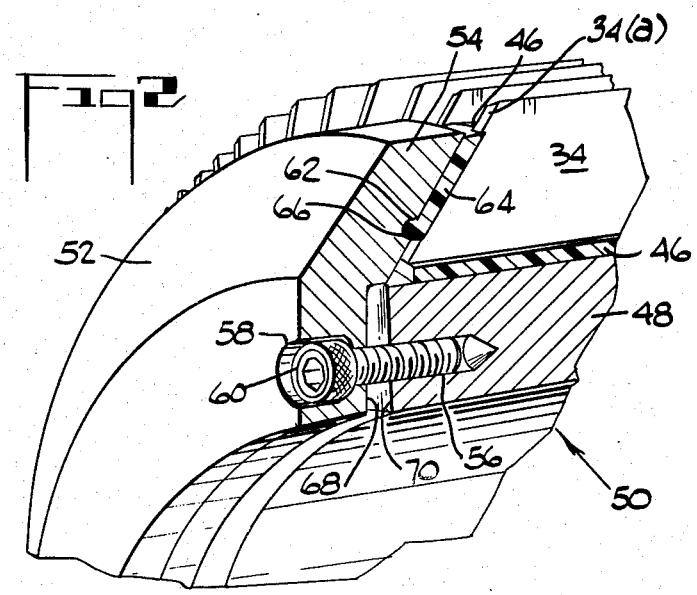
FIG. 2 is a partially broken away perspective of an assembled section of a blade roll showing the improved blade retainer of the present invention.

The improved blade retaining means of the present invention is illustrated in FIG. 2 wherein a plurality of blades 34, of generally trapezoidal cross-section as in U.S. Pat. No. 4,083,279, are resiliently mounted, as in the above-referenced patent, in a resilient, durable elastomer tire 46 of the general type disclosed in U.S. Pat. No. 4,083,279. The elastomer tire 46 is affixed about the outer circumferential surface of a core 48 of a blade roll cylinder member 50. The tire 46 is to be considered part of member 50.

A pair of annular blade retainers 52 (only one of which is shown in FIG. 2), having inwardly directed flanges 54 with slopes matching the incline of the trapezoidal blades 34, are secured to the ends of the core 48 of the blade roll cylinder member 50. The blade roll cylinder member 50 and the annular blade retainers 52 may be constructed with aligning holes as at 56, 58 through which conventional fastening means such as socket head cap screws 60 may be threaded so as to fasten the blade retainer 52 to a side of the blade roll cylinder member 50. A blade roll end cover (not shown) finishes each end base of the blade roll cylinder member 50 and thus a blade roll for use as shown in FIG. 1.

As illustrated in FIG. 2 retainers 52 have at least one annular groove 62 in the inwardly directed flanges 54. An annular blade retaining ring 64, made of elastomer such as urethane is juxtaposed between the flange 54 of each blade retainer 52 and the side edges 34a of blades 34. An annular bead 66, of approximately $\frac{1}{8}''$ radius, formed at a distal portion of each retaining ring 64, is positioned within each annular groove 62 such that each blade retaining ring 64 may be located and held in place during assembly. The blade retaining rings 64 engage the ends of the chopper blades 34 to hold the chopper blades in position in the blade roll cylinder member 50 when the blade retainers 52 are in place at the ends of the blade roll cylinder member 50. The chopper blades 34 elastically deform the urethane rings 64 approximately one-third of its thickness but do not sever or harm the blade retaining rings either partially or entirely for several reasons. First, the angle of inclination of flange 54 is selected so that when screws 60 are tightened and the blades 34 are firmly in place due to their interengagement with urethane rings 64, the surfaces 68 of each blade retainer 52 does not "bottom-out" on the surfaces 70 of core 48. Should the surfaces 68, 70 come into an abutting contact the resilient rings 64 may be severed as in U.S. Pat. Nos. 3,508,461 and 3,644,109. Secondly, the thickness of the annular blade retaining rings 64 is in the range of 0.05–0.10″ adding to the strength of rings 64. Thicker retaining rings may be used, e.g. 0.1875" although a retaining ring of 0.09" has been found to be completely satisfactory. The thickness of the rings 64 is also a factor in providing a cushioned support for the blades 34. Thirdly, the hardness of the annular blade retaining rings 64 is selected to preclude any disintegration of the rings over an extended lifetime. The Shore A hardness of the urethane retaining rings 64 is preferably on the order of 90 durometer although it is clear that the skilled artisan is capable of selecting the appropriate hardness for a particular purpose.

Thus the resilient urethane blade retainer rings 64 will accommodate any dimensional differences in the various components without incurring a deleterious fragmentation. When assembled any excess blade length is absorbed by urethane rings 64. The degree of inclination of the flanges 54 of the annular blade retainers 52 and their spacing from member 50 plus the hardness of the elastomer retaining rings 64 ensure that the chopper blades 34 cannot completely sever the retaining rings 64 as is the case in U.S. Pat. Nos. 3,508,461 and 3,644,109. Furthermore, the urethane retaining rings 64 give the blades a cushion support. The end stresses on the blades are thereby reduced, thereby substantially eliminating blade breakage. Finally, since the urethane retaining rings are now severed or damaged they can be used over and over thereby reducing the frequency of replacing the urethane rings at the time the blade roll is rebuilt.

With this construction the chopping blades are securely held in position in the blade roll cylinder member 50. The urethane coating on which the blades are seated (i.e., tire 46) and the urethane inserts 64 absorb the shock imposed on the chopper blades when cutting the strands 18.

For the purpose of setting forth this invention, a specific apparatus has necessarily been disclosed. Various modifications and substitutions of elements therefore is entirely feasible while retaining the basic features and benefits of the invention. It should also be recognized that the term "strands" is utilized generically herein and should be interpreted as encompassing rovings, yarn, filaments and tapes.

I claim:

1. In a cylindrical blade roll having an axis of rotation along its centerline for use with a chopper assembly for cutting strands into short lengths comprising a blade roll cylinder member, an elastomer tire affixed about said cylinder member, a plurality of chopper blades projecting generally radially from said tire, each of said blades having a cutting edge, a base portion and two sides, and blade retaining means, the improvement comprising:
    said blade retaining means comprising an annular blade retainer positioned at each axial extremity of said blade roll cylinder member, an axially inward surface of each of said blade retainers having at least one annular groove therearound and an annular elastomer ring juxtaposed between each of said blade retainers and said blades, said elastomer ring having at least one annular bead positioned within said groove, whereby a cushioned support is provided for said blades.

2. The blade roll of claim 1, wherein said annular bead is formed at a distal portion of said ring.

3. The blade roll of claim 1 or 2 wherein said ring is made of a urethane material.

4. The blade roll of claim 3, wherein the hardness of said material has a Shore A hardness of about 90 durometer.

5. The blade roll of claim 4, wherein said axially inward surface is inclined toward said blades, the angle of inclination of said axially inward surface being selected so that when said annular blade retainer is positioned at each axial extremity of said blade roll cylinder member, said blades are elastically embedded in said elastomer ring.

6. The blade roll of claim 1, wherein the thickness of said ring is between 0.05–0.10 inches.

7. The blade roll of claim 6 wherein the thickness of said ring is 0.09 inches.

8. The blade roll of claim 7, wherein said axially inward surface is inclined toward said blades, the angle of inclination of said axially inward surface being selected so that when said annular blade retainer is positioned at each axial extremity of said blade roll cylinder member, said blades are elastically embedded in said elastomer ring.

9. A chopper assembly for cutting strands into short lengths, comprising:
    a blade roll comprising a blade roll cylinder member, a plurality of chopper blades projecting generally radially therefrom, each of said blades having a cutting edge, a base portion and two sides;
    blade retaining means comprising an annular blade retainer positioned at each axial extremity of said blade roll cylinder member, each axially inward surface of said blade retainers having at least one annular groove and a blade retaining elastomer insert positioned between a blade retainer and said blades, said insert having an annular bead disposed in said groove for positioning said insert relative to said blade retainers and said blades, said blades elastically deforming a surface of said insert;
    a backup roll adjacent to said blade roll, means for supplying strands between said blades and said backup roll, and
    means for rotating said blade roll and said backup roll so that strands delivered from said blades and said backup roll are cut into discrete lengths.

10. The chopper assembly of claim 9 wherein said blades elastically deform said insert one-third of its total thickness.

11. The chopper assembly of claim 9 or 10, wherein said annular bead has approximately a $\frac{1}{8}$" radius.

12. The chopper assembly of claim 11, wherein said axially inward surface is inclined toward said blades, the angle of inclination of said axially inward surface being selected so that when said annular blade retainer is positioned at each axial extremity of said blade roll cylinder member, said blades are elastically embedded in said elastomer insert.

* * * * *